US007756273B2

(12) United States Patent
Taunton et al.

(10) Patent No.: US 7,756,273 B2
(45) Date of Patent: Jul. 13, 2010

(54) SYSTEM AND METHOD FOR BIT-REVERSING AND SCRAMBLING PAYLOAD BYTES IN AN ASYNCHRONOUS TRANSFER MODE CELL

(75) Inventors: Mark Taunton, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1451 days.

(21) Appl. No.: 10/946,305

(22) Filed: Sep. 22, 2004

(65) Prior Publication Data

US 2005/0068959 A1    Mar. 31, 2005

Related U.S. Application Data

(60) Provisional application No. 60/505,857, filed on Sep. 26, 2003.

(51) Int. Cl.
*H04K 1/00*     (2006.01)
(52) U.S. Cl. .................................. 380/255; 380/257
(58) Field of Classification Search ................ 380/255, 380/257, 28; 713/174
See application file for complete search history.

(56) References Cited

U.S. PATENT DOCUMENTS

| 5,369,773 | A | 11/1994 | Hammerstrom |
|---|---|---|---|
| 5,612,974 | A | 3/1997 | Astrachan |
| 5,719,890 | A | 2/1998 | Thomman et al. |
| 5,809,493 | A | 9/1998 | Ahamed et al. |
| 5,909,427 | A | 6/1999 | Manning et al. |
| 5,931,965 | A | 8/1999 | Alamouti |
| 5,954,836 | A | 9/1999 | Wang |
| 6,061,449 | A | 5/2000 | Candelore et al. |
| 6,081,921 | A | 6/2000 | Simanapalli |
| 6,182,265 | B1 | 1/2001 | Lim et al. |
| 6,208,655 | B1 | 3/2001 | Hodgins et al. |
| 6,314,102 | B1 | 11/2001 | Czerwiec et al. |
| 6,442,729 | B1 | 8/2002 | Kim et al. |
| 6,448,910 | B1 | 9/2002 | Lu |
| 6,570,927 | B1 | 5/2003 | Van Stralen et al. |
| 6,577,678 | B2 | 6/2003 | Scheuermann |
| 6,594,262 | B1 | 7/2003 | Kwon et al. |
| 6,631,488 | B1 | 10/2003 | Stambaugh et al. |
| 6,697,994 | B2 | 2/2004 | Ishikawa |
| 6,754,283 | B1 | 6/2004 | Li |
| 6,915,427 | B2 | 7/2005 | Jones, IV et al. |

(Continued)

OTHER PUBLICATIONS

Splitterless asymmetric digital subscriber line transceivers 2 (splitterless ADSL2), International Telecommunications Union (ITU-T Recommendation G.992.4), 24 pages, Jul. 2002.

(Continued)

*Primary Examiner*—Hosuk Song
(74) *Attorney, Agent, or Firm*—Sterne, Kessler, Goldstein & Fox PLLC

(57) ABSTRACT

A method and apparatus are disclosed for efficiently bit-reversing and scrambling one or more bytes of payload data according to DSL standards on a processor. In one embodiment, this is achieved by providing an instruction for bit reversing and scrambling one or more bytes of data according to the DSL standards. Accordingly, the invention advantageously provides a processor with the ability to bit reverse and scramble data with a single instruction thus allowing for more efficient and faster scrambling operations for subsequent modulation and transmission.

20 Claims, 4 Drawing Sheets

U.S. PATENT DOCUMENTS

| | | | |
|---|---|---|---|
| 6,915,472 | B1 | 7/2005 | Jones IV et al. |
| 7,039,852 | B2 | 5/2006 | Dent |
| 7,055,088 | B2 | 5/2006 | Betts |
| 7,139,305 | B2 | 11/2006 | Gavnoudias et al. |
| 7,154,895 | B1 | 12/2006 | Bornemisza et al. |
| 7,199,740 | B1 | 4/2007 | Ferguson et al. |
| 7,305,567 | B1 * | 12/2007 | Hussain et al. .............. 713/189 |
| 7,305,608 | B2 | 12/2007 | Taunton et al. |
| 7,580,412 | B2 | 8/2009 | Taunton et al. |
| 2001/0008001 | A1 | 7/2001 | Suemura |
| 2002/0124154 | A1 | 9/2002 | Stacey et al. |
| 2002/0138721 | A1 | 9/2002 | Kwon et al. |
| 2003/0016670 | A1 | 1/2003 | Seidl et al. |
| 2003/0091109 | A1 | 5/2003 | Okunev et al. |
| 2003/0190910 | A1 | 10/2003 | Scheuermann |
| 2003/0225949 | A1 * | 12/2003 | Hoang et al. .................. 710/22 |
| 2004/0025104 | A1 | 2/2004 | Amer |
| 2005/0068957 | A1 | 3/2005 | Taunton et al. |
| 2005/0068958 | A1 | 3/2005 | Taunton et al. |
| 2005/0069134 | A1 | 3/2005 | Taunton et al. |
| 2005/0084104 | A1 | 4/2005 | Taunton et al. |
| 2005/0094551 | A1 | 5/2005 | Taunton et al. |
| 2005/0100111 | A1 | 5/2005 | Taunton et al. |
| 2005/0240936 | A1 | 10/2005 | Jones et al. |
| 2006/0050739 | A1 | 3/2006 | Narad et al. |
| 2008/0137771 | A1 | 6/2008 | Taunton et al. |

OTHER PUBLICATIONS

Asymmetric digital subscriber line (ADSL) transceivers, International Telecommunications Union (ITU-T Recommendation G.992. 1), 256 pages, Jun. 1999.

Splitterless asymmetric digital subscriber line (ADSL) transceivers, International Telecommunication Union (ITU-T Recommendation G.992.2), 179 pages, Jun. 1999.

Asymmetric digital subscriber line transceivers 2 (ADSL2), International Telecommunication Union (ITU-T Recommendation G.992. 3), 436 pages, Jan. 2005.

International Telecommunications Union, "Integrated Services Digital Network (ISDN) ISDN User Network Interfaces", ITU-T Recommendation I.432, Mar. 1993, all pages.

Wen-Yu Tseng et al., "Design and Implementation of a High Speed Parallel Architecture for ATM UNI," ispan, pp. 288-294, 1996 International Symposium on Parallel Architectures, Algorithms and Networks (ISPAN '96), 1996.

Seo et al., "Bit-level packet-switching all-optical multihop shuffle networks with deflection routing", Applied Optics, vol. 36, No. 14, May 10, 1997, pp. 3142-3146.

Wilson, "FirePath" Tuesday, Aug. 20, 2002.

Clarke, "Broadcom's Firepath combines RISC, DSP elements", EE Times (Jun. 13, 2001 3:27 PM EDT).

Jae Sung Lee, "Design of new DSP instructions and their hardware architecture for highspeed FFT", 2001 IEEE Workshop on Signal Processing Systems, IEEE Workshop on Sep. 26-28, 2001 pp. 80-90.

Seong-Jo Na, "Design and implementation for 125 mW/MIPS ultra-high speed low power asymmetric digital subscriber line transceiver chip", the First IEEE Asia Pacific Conference on ASICs, 1999, AP-ASIC '99, Aug. 23-25, 1999 pp. 21-24.

Non-Final Rejection mailed Feb. 5, 2008 for U.S. Appl. No. 10/946,304, 20 pgs.

Final Rejection mailed Oct. 20, 2008 for U.S. Appl. No. 10/946,304, 22 pgs.

Notice of Allowance mailed Apr. 15, 2009 for U.S. Appl. No. 10/946,304, 4 pgs.

Non-Final Rejection mailed May 12, 2008 for U.S. Appl. No. 10/946,303, 13 pgs.

Final Rejection mailed Nov. 14, 2008 for U.S. Appl. No. 10/946,303, 12 pgs.

Notice of Allowance mailed Jan. 25, 2010 for U.S. Appl. No. 10/946,303, 10 pgs.

Non-Final Rejection mailed Jan. 16, 2008 for U.S. Appl. No. 10/946,173, 12 pgs.

Second Non-Final Rejection mailed Oct. 28, 2008 for U.S. Appl. No. 10/946,173, 14 pgs.

Final Rejection mailed May 12, 2009 for U.S. Application No. 10/946,173, 14 pgs.

Non-Final Rejection mailed Mar. 27, 2008 for U.S. Appl. No. 10/946,306, 12 pgs.

Final Rejection mailed Oct. 29, 2008 for U.S. Appl. No. 10/946,306, 13 pgs.

Third Non-Final Rejection mailed Nov. 24, 2009 for U.S. Appl. No. 10/946,173, 15 pgs.

* cited by examiner

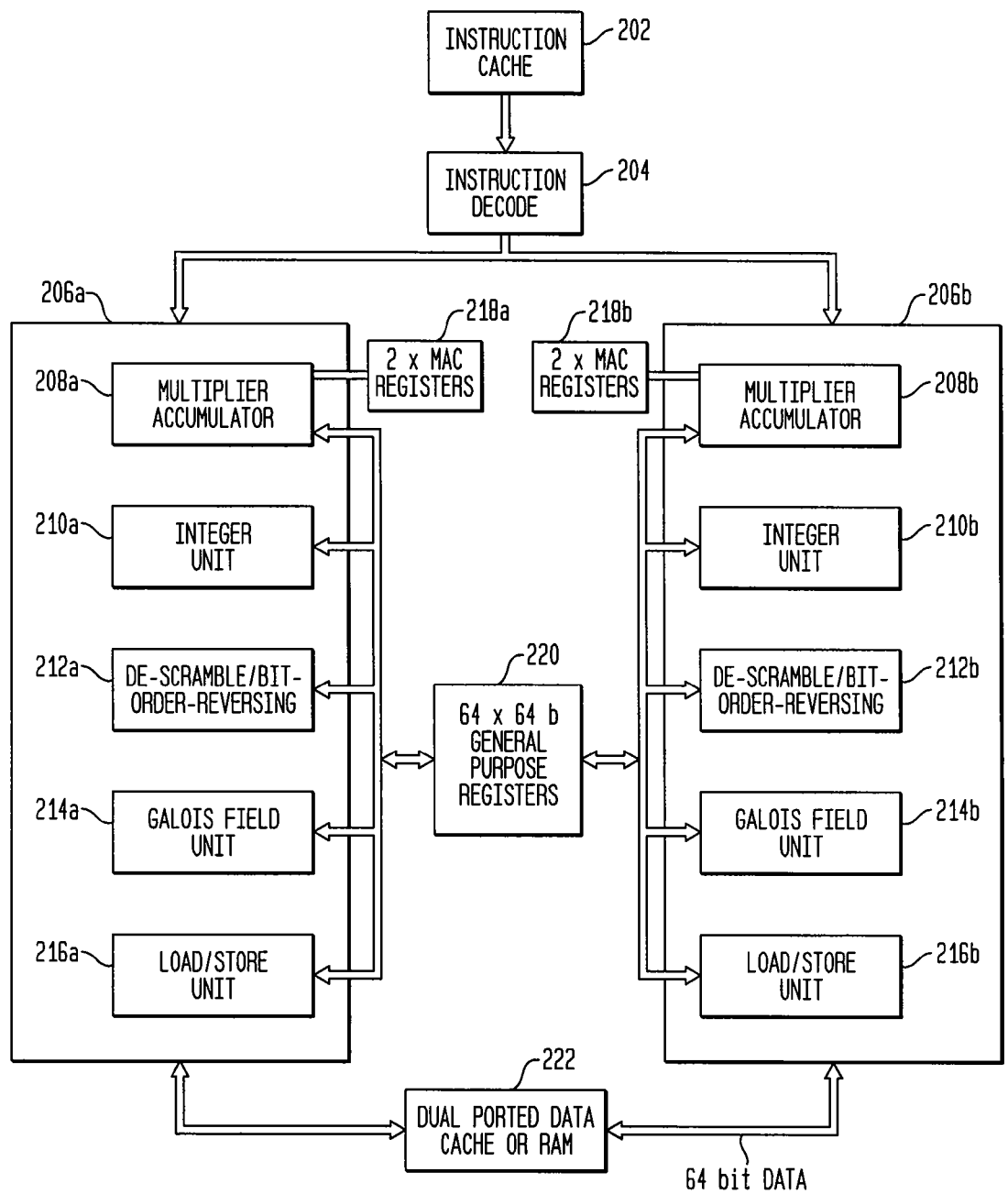

*FIG. 3A*

| OPCODE | DESTINATION | SOURCE 1 | SOURCE 2 |

*FIG. 3B*

| ATMDSC | OUT | STATE | IN |

SYSTEM AND METHOD FOR BIT-REVERSING AND SCRAMBLING PAYLOAD BYTES IN AN ASYNCHRONOUS TRANSFER MODE CELL

RELATED APPLICATIONS

This application claims priority from U.S. provisional application No. 60/505,857 filed on Sep. 26, 2003 by Mark Taunton & Timothy Martin Dobson and entitled "System and Method for Bit Reversing and Scrambling Payload Bytes in an Asynchronous Transfer Mode Cell," which is incorporated by reference herein in its entirety.

FIELD OF THE INVENTION

The present invention relates generally to Asynchronous Transfer Mode (ATM) systems and to the design of instructions for processors. More specifically, the present invention relates to a system, method and processor instruction for bit-reversing and scrambling ATM payload data.

BACKGROUND OF THE INVENTION

ATM (Asynchronous Transfer Mode) cell streams are a commonly used way to format and transport data in a digital telecommunication system, for example over an ADSL (Asymmetric Digital Subscriber Line) link. An ATM cell comprises a 5-byte cell header and 48 bytes of payload. The cell header contains address and control data, which is used in a network to direct the transfer of the ATM cell from its source to its destination. The payload contains the data to be communicated to the destination.

International standards for ADSL and other forms of DSL (such as ITU-T Recommendation G992.1 entitled "Asymmetrical digital subscriber line (ADSL) transceivers," ITU-T Recommendation G992.2 entitled "Splitterless asymmetric digital subscriber line (ADSL) transceivers," ITU-T Recommendation G992.3 entitled "Asymmetric digital subscriber line transceivers-2 (ADSL2)," and ITU-T Recommendation G992.4 entitled "Splitterless asymmetric digital subscriber line transceivers 2 (splitterless ADSL2)") define a method of conveying ATM cell streams over the DSL link. The method requires, amongst other things, that as cells are processed in the transmitting modem, the payload data bytes in each transmitted cell are scrambled using a self-synchronizing scrambler with polynomial $X^{43}+1$. An equivalent way of describing the scrambling process is that for the stream of successive bits making up the input to the scrambler, $x(n)$ ($n=0, 1, 2, \ldots$), the output of the scrambler $y(n)$ is defined recursively as:

$$y(n)=x(n)+y(n-43)$$

where + means addition modulo 2 (which is equivalent to logical "exclusive-or"). In other words, for each input bit, the output bit is the exclusive-or of that input bit and the output bit from 43 bit-times earlier.

The scrambling process is continuous over all bits of all payload bytes of all transmitted cells in a given ATM cell stream; it does not stop at the end of one byte or cell and start independently at the beginning of the next. Rather, the previous output bits which are used in the scrambling of new input bits are derived in the same way for every bit processed, without regard to byte or cell boundaries.

According to ATM standards, only the payload bytes are scrambled in this way: the header bytes are not scrambled and play no part in the process. For purposes of the scrambling process, the payload bytes of one cell are considered consecutive with the payload bytes of the preceding cell, ignoring the header bytes at the start of the new cell.

This scrambling scheme is also employed in a number of other contexts where ATM streams are passed between processing units over intermediate links.

A further common requirement for transmission of ATM cell streams over a DSL link concerns the ordering of the data bits in each byte of the ATM cell data being sent and received over the DSL link. When cells are passed across the external data interface of a DSL modem, DSL standards require the bits in each byte of the cell to be reversed in order. This is because whereas external to the modem, the most significant bit of each byte is considered to come first and is processed first, internally in the modem, the least significant bit of each byte is processed first, but the actual order of processing of the bits must be preserved. This reversal applies to all bytes of each ATM cell.

In an ATM-based modem in a telecommunication system, ATM cells may pass through the device for transmission at a high rate (for example in a multi-line ADSL or VDSL modem in a central-office DSL access multiplexer). It is therefore necessary to scramble the payload data of ATM cells efficiently. In prior art hardware oriented DSL modems, the ATM cell streams flow through fixed-function hardware circuits that include the logic to scramble the payload data stream. However, such system designs are typically much less adaptable to varying application requirements. In such hardware implementations of the scrambling function the data flow is fixed in an arrangement dictated by the physical movement of data through the hardware, and cannot be adapted or modified to suit different modes of use. For example, in such systems, the 'state' (the history of earlier output bits) is held internally within the scrambling hardware, rather than being passed in as and when scrambling is required. This means that re-using a hardware implementation to scramble multiple distinct data streams at the same time is either impossible, or certainly more complex to implement, since some arrangement must be made to allow the individual states for the different streams to be swapped in and out.

Current prior art DSL modems often use software to perform at least some of the various functions in a modem. One disadvantage of scramblers in current DSL modems is the inefficiency of such scramblers as the line-density and data-rates required of modems increase. As line-density and data-rates increase, so does the pressure on prior art modems to perform efficiently the individual processing tasks, such as scrambling, which make up the overall modem function.

Another disadvantage with current prior art scramblers is the software complexity required to implement such scramblers. Using conventional bit-wise instructions such as bit-wise shift, bit-wise exclusive-or, etc. may take many tens or even hundreds of cycles to perform the ATM scrambling operation for a single ATM cell. One processor may need to handle several hundred thousand ATM cells per second. Thus, the scrambling process for each cell can represent a significant proportion of the total computational cost for current prior art DSL modems, especially in the case of a multi-line system where one processor handles the operations for multiple lines. With increasing workloads, it becomes necessary to improve the efficiency of scrambling ATM cell payload bytes over that of such prior art modems.

Further limitations and disadvantages of conventional and traditional approaches will become apparent to one of skill in the art through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

The present invention provides a method and apparatus for efficiently bit-reversing and scrambling one or more bytes of ATM payload data according to DSL standards. In a preferred embodiment of the invention, this is achieved by providing an instruction for bit-reversing and scrambling one or more bytes of data according to the DSL standards in a modem processor. In this embodiment, the system and method of the present invention advantageously provide a processor with the ability to bit-reverse and scramble data with a single instruction thus allowing for more efficient and faster scrambling operations for subsequent modulation and transmission. The present invention also advantageously provides great flexibility in determining the arrangement and flow of data during the scrambling process through the use of registers and memory for storing the original data to be scrambled, the resulting scrambled data, and the state data.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 illustrates a block diagram of a processor in accordance with one embodiment of the present invention.

FIG. 3A illustrates an instruction format for a three-operand instruction supported by the processor in accordance with one embodiment of the present invention.

FIG. 3B illustrates an instruction format for bit-reversing and scrambling one or more bytes in accordance with one embodiment of the present invention.

DETAILED DESCRIPTION OF THE INVENTION

Figure 1:
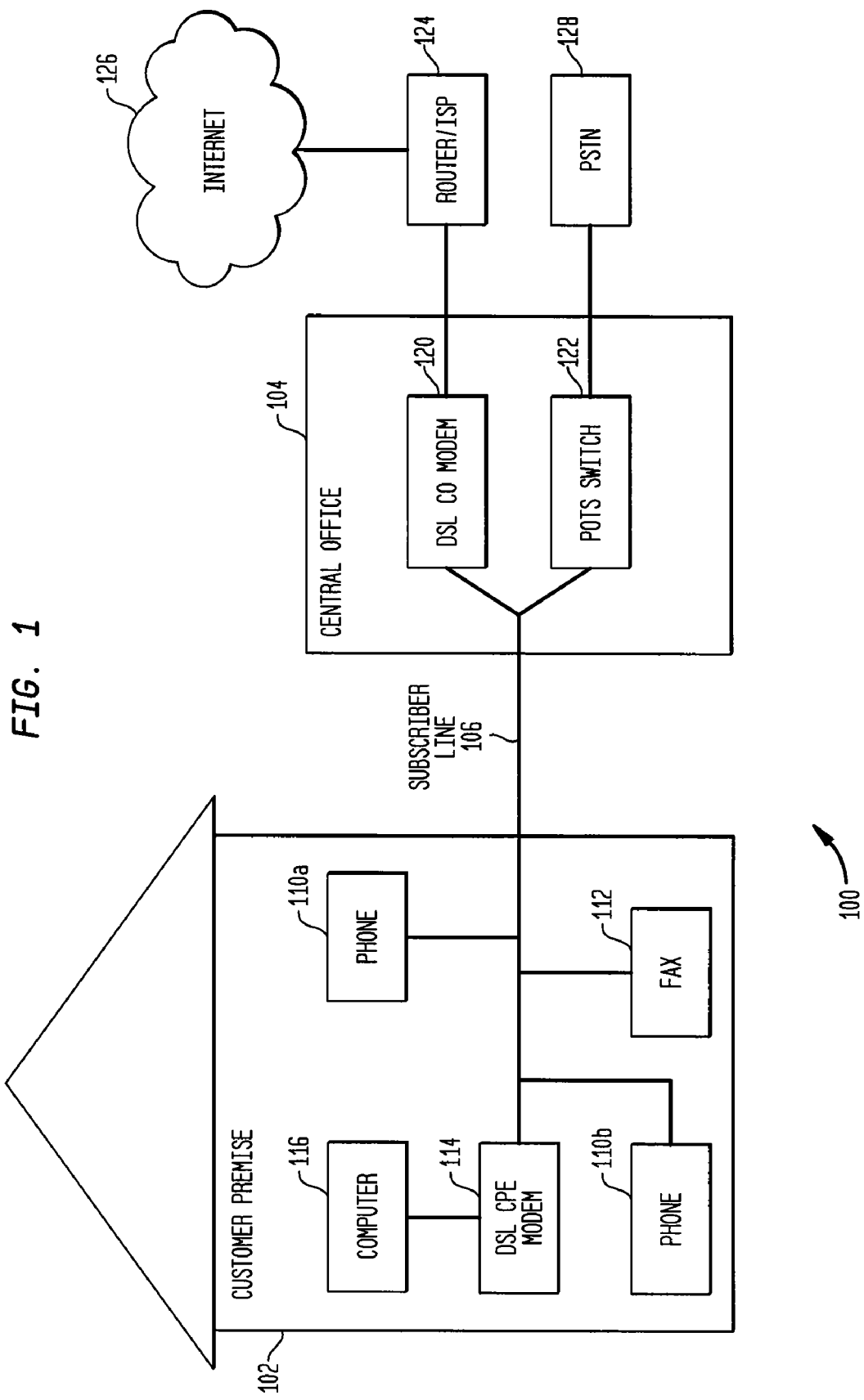
FIG. 1 illustrates a block diagram of a communications system in accordance with the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The invention generally pertains to a new instruction for operating a processor which significantly reduces the number of cycles needed to perform the bit-order-reversal and scrambling of ATM cell payload data. The present invention directly implements both the bit-order-reversal and scrambling process for 8 bytes (64 bits) of payload data in a single operation. The instruction takes as input 64 bits of new (original) source data, and 43 bits of previous scrambling state, and produces as output 64 bits of bit-reversed and scrambled payload data. Because the scrambling process is recursive, the last 43 bits of the output value from one application of the instruction for some ATM payload data stream act as the "previous state" input to the next application of the instruction to the same stream. As used herein, the terms bit-reverse or bit-order reversal mean creating a new linear bit sequence by taking the bits of the original linear bit sequence in reverse order as is required under DSL standards for the transmission of ATM cells. The present invention can be used in an implementation of an ADSL Termination Unit-Central (Office) (ATU-C), in an ADSL Termination Unit-Remote end (ATU-R), in a VDSL Transceiver Unit-Optical network unit (VTU-O) or VDSL Transceiver unit-Remote site (VTU-R), or in other contexts that require payload data to be scrambled in the same way.

The new instruction takes as one input an 8-byte sequence of ATM cell payload bytes (assumed to have been transferred directly from a modem's external data interface) as a composite 64-bit value. Its second input is a 43-bit value holding the internal state of the scrambling process between consecutive sections of data being scrambled. As described above this 43-bit state is equal to the last 43 bits of the previous output of the scrambling process (i.e. the result of a previous execution of the instruction to process the previous 8 bytes of payload data).

Embodiments of the invention are discussed below with references to FIGS. 1 to 4. However, those skilled in the art will readily appreciate that the detailed description given herein with respect to these figures is for explanatory purposes as the invention extends beyond these limited embodiments.

Referring now to FIG. 1, there is shown a block diagram of a communications system 100 in accordance with one embodiment of the present invention. System 100 provides traditional voice telephone service (plain old telephone service—POTS) along with high speed Internet access between a customer premise 102 and a central office 104 via a subscriber line 106. At the customer premise end 102, various customer premise devices may be coupled to the subscriber line 106, such as telephones 110a, 110b, a fax machine 112, a DSL CPE (Customer Premise Equipment) modem 114 and the like. A personal computer 116 may be connected via DSL CPE modem 114. At the central office end 104, various central office equipment may be coupled to the subscriber line 106, such as a DSL CO (Central Office) modem 120 and a POTS switch 122. Modem 120 may be further coupled to a router or ISP 124 which allows access to the Internet 126. POTS switch 122 may be further coupled to a PSTN 128.

In accordance with one embodiment of the present invention, system 100 provides for data to be sent in each direction as a stream of ATM cells between the central office 104 and the customer premise 102 via subscriber line 106. As data is sent from the central office 104 to the customer premise 102, the DSL CO modem 120 at the central office 104 bit reverses and then scrambles the payload data of each ATM cell in accordance with the principles of the present invention before modulating and transmitting the data via subscriber line 106. Similarly, when data is sent from the customer premise 102 to the central office 104, the DSL CPE modem 114 at the customer premise 102 bit reverses and then scrambles the payload data of each cell in accordance with the principles of the present invention before modulating and transmitting the data via subscriber line 106. In a preferred embodiment, DSL CO modem 120 incorporates a BCM6411 or BCM6510 device, produced by Broadcom Corporation of Irvine, Calif., to implement its various functions.

Referring now to FIG. 2, there is shown a schematic block diagram of the core of a modem processor 200 in accordance with one embodiment of the present invention. In a preferred embodiment, processor 200 is the FirePath processor used in the BCM6411 and BCM6510 devices. The processor 200 is a 64 bit long instruction word (LIW) machine consisting of two execution units 206a, 206b. Each unit 206a, 206b is capable of 64 bit execution on multiple data units, (for example, four 16 bit data units at once), each controlled by half of the 64 bit instruction. The twin execution units, 206a, 206b, may include single instruction, multiple data (SIMD) units.

Processor 200 also includes an instruction cache 202 to hold instructions for rapid access, and an instruction decoder 204 for decoding the instruction received from the instruction cache 202. Processor 200 further includes a set of MAC Registers 218a, 218b, that are used to improve the efficiency of multiply-and-accumulate (MAC) operations common in digital signal processing, sixty four (or more) general purpose registers 220 which are preferably 64 bits wide and shared by execution units 206a, 206b, and a dual ported data cache or RAM 222 that holds data needed in the processing performed by the processor. Execution units 206a, 206b further comprise multiplier accumulator units 208a, 208b, integer units 210a, 210b, bit reverse/scrambler units 212a, 212b, Galois Field units 214a, 214b, and load/store units 216a, 216b.

Multiplier accumulator units 208a, 208b perform the process of multiplication and addition of products (MAC) commonly used in many digital signal processing algorithms such as may be used in a DSL modem.

Integer units 210a, 210b, perform many common operations on integer values used in general computation and signal processing.

Galois Field units 214a, 214b perform special operations using Galois field arithmetic, such as may be executed in the implementation of the well-known Reed-Solomon error protection coding scheme.

Load/store units 216a, 216b perform accesses to the data cache or RAM, either to load data values from it into general purpose registers 220 or store values to it from general purpose registers 220. They also provide access to data for transfer to and from peripheral interfaces outside the core of processor 200, such as an external data interface for ATM cell data.

Bit reverse/scrambler units 212a, 212b directly implement the bit reverse and scrambling process for the processor 200. These units may be instantiated separately within the processor 200 or may be integrated within another unit such as the integer unit 210. In one embodiment, each bit reverse/scrambler unit 212a, 212b takes as input 64 bits of new (original) source data, and 43 bits of previous scrambling state, and produces as output 64 bits of bit-reversed and scrambled payload data. Because of the recursive definition of the scrambling process, the last 43 bits of the output value from one application of this instruction for some data stream act as the "previous scrambling state" input to the next application of the scrambling function to the same data stream.

Referring now to FIG. 3A, there is shown an example of an instruction format for a three-operand instruction supported by the processor 200. In one embodiment, the instruction format includes 14 bits of opcode and control information, and three six-bit operand specifiers. As will be appreciated by one skilled in the art, exact details such as the size of the instruction in bits, and how the various parts of the instruction are laid out and ordered within the instruction format, are not themselves critical to the principles of the present invention: the parts could be in any order as might be convenient for the implementation of the instruction decoder 204 of the processor 200 (including the possibility that any part of the instruction such as the opcode and control information may not be in a single continuous sequence of bits such as is shown in FIG. 3) The operand specifiers are references to registers in the set of general purpose registers 220 of processor 200. The first of the operands is a reference to a destination register for storing the results of the instruction. The second operand is a reference to a first source register for the instruction, and the third operand is a reference to a second source register for the instruction.

Referring now to FIG. 3B, there is shown an example of a possible instruction format for bit-reversing and scrambling one or more bytes of data (ATMSCR) supported by processor 200 in accordance to the present invention. Again it should be observed that exact details of how this instruction format is implemented—the size, order and layout of the various parts of the instruction, exact codes used to represent the ATMSCR opcode, etc.—are not critical to the principles of the present invention. The ATMSCR instruction uses the three-operand instruction format shown in FIG. 3A, and in one embodiment, is defined to take three six-bit operand specifiers. The first of the operands is a reference to a destination register for an output "out" where the results of the ATMSCR instruction are stored. The second operand is a reference to a source register for a state input "state" from which state data is read, and the third operand is a reference to a source register for the data input "in" from which the original source data is read. One skilled in the art will realize that the present invention is not limited to any specific register or location for those registers but that the instruction of the present invention may refer to an arbitrary register in the general purpose registers 220.

Thus, by means of this generality of specification, the present invention advantageously achieves great flexibility in the use of the invention. For example, the present invention enables the original data, which is to be bit-order reversed and scrambled, to be obtained from any location chosen by the implementor (e.g. by first loading that data from the memory 222, or from an external data interface connected via load/store units 216a, 216b, into any convenient register). Likewise, the resulting bit-reversed and scrambled data may be placed anywhere convenient for further processing such as in some general purpose register 220 for immediate further operations, or the resulting bit-reversed and scrambled data may be placed back in memory 222 for later use. Similarly, the arrangement of how the 'state' data is obtained is also completely unconstrained, but may be arranged according to preference as to how the unscrambled and scrambled data streams are handled. Thus, the flexibility of the present invention is in sharp contrast to conventional (hardware) implementations of the scrambling function, where the data flow is fixed in an arrangement dictated by the physical movement of data through the hardware, and cannot be adapted or modified to suit different modes of use. For example, typically in such hardware contexts the 'state' (the history of earlier output bits) is held internally within the scrambling hardware, rather than being passed in as and when scrambling is required. This means that re-using a hardware implementation to scramble multiple distinct data streams at the same time is either impossible, or certainly more complex to implement, since some arrangement must be made to allow the individual states for the different streams to be swapped in and out.

Including the bit-reversal process as part of the function carried out by the instruction in the present invention is advantageous in that the external data interface circuitry through which the ATM cells are received can simply pass all bytes through in the standard bit-order, rather than itself reverse the order. Thus, the external data interface as used with the present invention is not specialized to the handling of only ATM cell data and could be used to transfer other types of data (which are unlikely to require the bit-order reversal) without impediment. Moreover, the present invention allows for software to process certain parts of the ATM cells (particularly the cell headers which are distinct from the payload bytes) in the standard bit order (as used outside the DSL modem), e.g. to work with cell addressing information which is stored in each cell header. If the modem's external data interface reversed the bit-order for all bytes passing through, this would necessitate an extra step of re-reversing the bit-order for the cell header bytes being specifically processed.

In one embodiment, the bit-reversal/scrambling instruction is used in the software on a processor chip-set implementing a central-office modem end of a DSL link (e.g. ADSL or VDSL). However, one skilled in the art will realize that the present invention is not limited to this implementation, but may be equally used in other contexts where data must be bit-reversed and scrambled in the same way, such as in a DSL CPE modem at the customer premise, or in systems not implementing DSL.

In one embodiment, the ATMSCR instruction takes as one input an 8-byte sequence of data bytes as a composite 64-bit value. Its second input is a 43-bit value holding the internal state of the scrambling process between consecutive sections of data being scrambled. In a preferred embodiment, this 43-bit state is equal to the last 43 bits of the previous output of the scrambling process (i.e. the result of a previous execution of the instruction to process the previous 8 bytes of payload data in the same data stream).

Thus, the 8 bytes of data each have their bit order reversed, thus satisfying the requirement for bit order change between external and internal versions of the bytes of each ATM cell, without requiring additional hardware in the modem circuits implementing the external data transfer. The payload data bytes are then scrambled using the defined scrambling method. In other words, the 64 bits of byte-reversed data are combined with the 43 bits of previous state to yield 64 bits of result. The 64 result bits are then written to the output operand.

More specific details of one embodiment of the operation performed by the ATMSCR instruction are described below:
tmp.<7..0>=BITREV(in.<7..0>)
tmp.<15..8>=BITREV(in.<15..8>)
tmp.<23..16>=BITREV(in.<23..16>)
tmp.<31..24>=BITREV(in.<31..24>)
tmp.<39..32>=BITREV(in.<39..32>)
tmp.<47..40>=BITREV(in.<47..40>)
tmp.<55..48>=BITREV(in.<55..48>)
tmp.<63..56>=BITREV(in.<63..56>)
out.<42..0>=tmp.<42..0>^state.<63..21>
out.<63..43>=tmp.<63..43>^tmp.<20..0>^state.<41..21>

In the above description, the meanings of the terms are defined as described below.

val.n (where val stands for any identifier such as tmp, state, etc. . . . and n stands for an integer, e.g. 45) means bit n of value val, where bit 0 is the least significant and earliest bit and bit 1 is the next more significant (more recent) bit, etc.

val.<m..n>means the linear bit sequence (val.m, val.(m−1), . . . val.n) considered as an ordered composite multi-bit entity where val.m is the most significant (and most recent) bit and val.n the least significant (and earliest) bit of the sequence.

BITREV(bseq) creates a new linear bit sequence by taking the bits of the linear bit sequence bseq in reverse order.

bseq1^bseq2 means the linear bit sequence resulting from a parallel bit-wise operation where each bit of the linear bit sequence bseq1 is combined with the corresponding bit of linear bit sequence bseq2 using the logical "exclusive-or" function.

Figure 4:
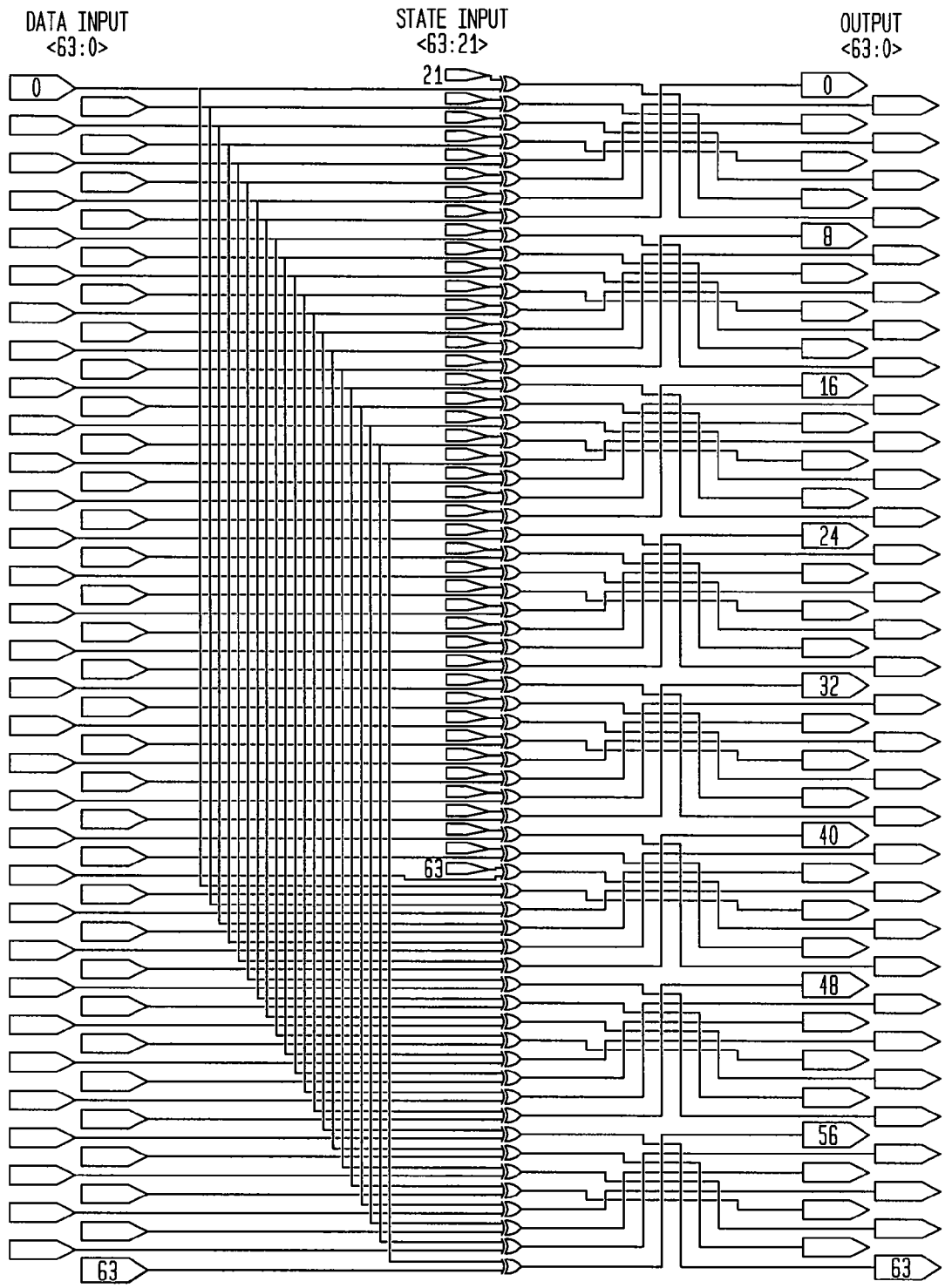
FIG. 4 is a logic diagram of one embodiment of the bit-reverse/scrambling instruction.

Referring now to FIG. 4, there is shown a logic diagram of one embodiment of the ATMSCR instruction as it may be implemented within an execution unit of a processor. As will be understood by one skilled in the art, the diagram shows only the core functional logic implementing the specific details of the ATMSCR instruction; other non-specific aspects required to implement any processor (such as how the source data bits are directed from their respective registers to the specific logic function for a particular instruction, and how the result value is returned to the required register), are not shown.

In the embodiment in FIG. 4, the gates shown are XOR gates. The first 21 bits of the state input are unused and not shown in FIG. 4. The 64 bits of the "data" input appear in order at the left of the diagram; the 43 used bits from the "state" input appear in order in the middle of the diagram; and the 64 bits of the output value "out" are generated in order at the right side of the diagram.

In the wiring format used in FIG. 4, a short gap is left in any horizontal wire which crosses but is not joined to a vertical wire to show that there is no connection between them. Any horizontal wire which crosses a number of vertical wires therefore appears as a dashed line.

One skilled in the art will realize that this is only one of many possible arrangements of the logic for the present invention. The present invention is not limited to this embodiment of the logic, but may apply to any logic arrangement that produces the same result. For example, in FIG. 4, the logic size is minimized (compared with the logic description given above) in that the values for bits 63 . . . 43 of the output are shown calculated by re-using the values of the output bits 20 . . . 0 as inputs. However, it is equally valid (and in some implementations may be preferable, e.g. to keep an equal load on all output bits) to calculate them purely from the relevant bits of the state input and bit-reversed data inputs, as is expressed in the logic description above. One skilled in the art will also appreciate that other logic circuitry for implementing the present invention may be generated by using a logic-optimizing software program, such as "BuildGates" by Cadence Design Systems, Inc., which is given as input a top-level description of the logic function, i.e. comparable to the equations listed above. Thus, the present invention advantageously completes the whole bit reverse and scrambling operation for 8 bytes in a single cycle. As a result, the present invention advantageously increases the efficiency of bit reversing and scrambling data for subsequent modulation and use.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for executing a single instruction bit-reversal and scrambler on a processor, the method comprising:

providing the processor with a single instruction that includes an opcode indicating a bit-reversal and scrambling instruction;

providing the processor with an input data value using a first field of the instruction;

providing the processor with an input state value using a second field of the instruction;

providing the processor with a reference to a destination register of the processor using a third field of the instruction;

bit-reversing and scrambling the input data value using the input state value to create a bit-reversed and scrambled output value; and storing the bit-reversed and scrambled output value in the destination register.

2. The method of claim 1, wherein the scrambling is performed in accordance with an ATM standard.

3. The method of claim 1, wherein the input data value is 64 bits of original source data.

4. The method of claim 1, wherein the bit-reversed and scrambled output value is a 64-bit output.

5. The method of claim 4, wherein the last 43 bits of the 64-bit output from one application of the bit-reversal and scrambling instruction is the input state value for a next application of the bit-reversal and scrambling instruction.

6. The method of claim 1, wherein the method is used in a central-office modem end or a customer premise equipment end of a DSL link.

7. A processor, comprising:

a plurality of registers; and at least one execution unit, coupled to the plurality of registers, configured to receive a single bit-reversal and scrambling instruction that includes a first field relating to an input data value and a second field relating to an input state value, bit-reverse and scramble the input data value using the input state value to generate a scrambled and bit-reversed output data value, and store said scrambled and bit-reversed output data value in at least one of said plurality of registers.

8. The processor of claim 7, wherein the instruction receives 64 bits of original source data as the input data value and 43 bits of previous scrambled and bit-reversed output data as the input state value, and produces as output 64 bits of scrambled and bit-reversed output data value.

9. The processor of claim 8, wherein the last 43 bits of the 64-bit scrambled and bit-reversed output data value from one application of the instruction is the input state value for the next application of the instruction.

10. The processor of claim 7, wherein the data is ATM cell payload data and the scrambling of the ATM cell payload data is performed according to relevant ATM standards.

11. The processor of claim 7, wherein the processor is a 64-bit long instruction word machine comprising two execution units.

12. The processor of claim 7, wherein the processor is used in a chip or chip-set implementing a central-office modem end or a customer premise end of a DSL link.

13. The processor of claim 7, wherein 8 bytes of data are bit-reversed and scrambled in a single cycle.

14. An apparatus, comprising:

a processor, responsive to a single instruction that includes a first field relating to an input data value and a second field relating to an input state value, comprising means for bit-reversing and scrambling said input data value using said input state value to generate a scrambled and bit-reversed output data value; and a plurality of registers accessible to the processor, wherein said scrambled and bit-reversed output data value is stored in at least one of said plurality of registers.

15. The apparatus of claim 14, wherein the instruction receives 64 bits of original source data as the input data value and 43 bits of previous scrambled and bit-reversed output data value as the input state value, and produces as output 64 bits of scrambled and bit-reversed output data value.

16. The apparatus of claim 15, wherein the last 43 bits of the 64-bit scrambled and bit-reversed output data value from one application of the instruction is the input state value for the next application of the instruction.

17. The apparatus of claim 14, wherein the data is ATM cell payload data and the scrambling of the ATM cell payload data is performed according to relevant ATM standards.

18. The apparatus of claim 14, wherein the processor is a 64-bit long instruction word machine comprising two execution units.

19. The apparatus of claim 14, wherein the processor is used in a chip or chip-set implementing a central-office modem end or a customer premise end of a DSL link.

20. The apparatus of claim 14, wherein 8 bytes of data are bit-reversed and scrambled in a single cycle.

* * * * *